INVENTOR:
FRANKLIN E. ARNDT,
BY
Chas. M. Niesen,
ATT'Y.

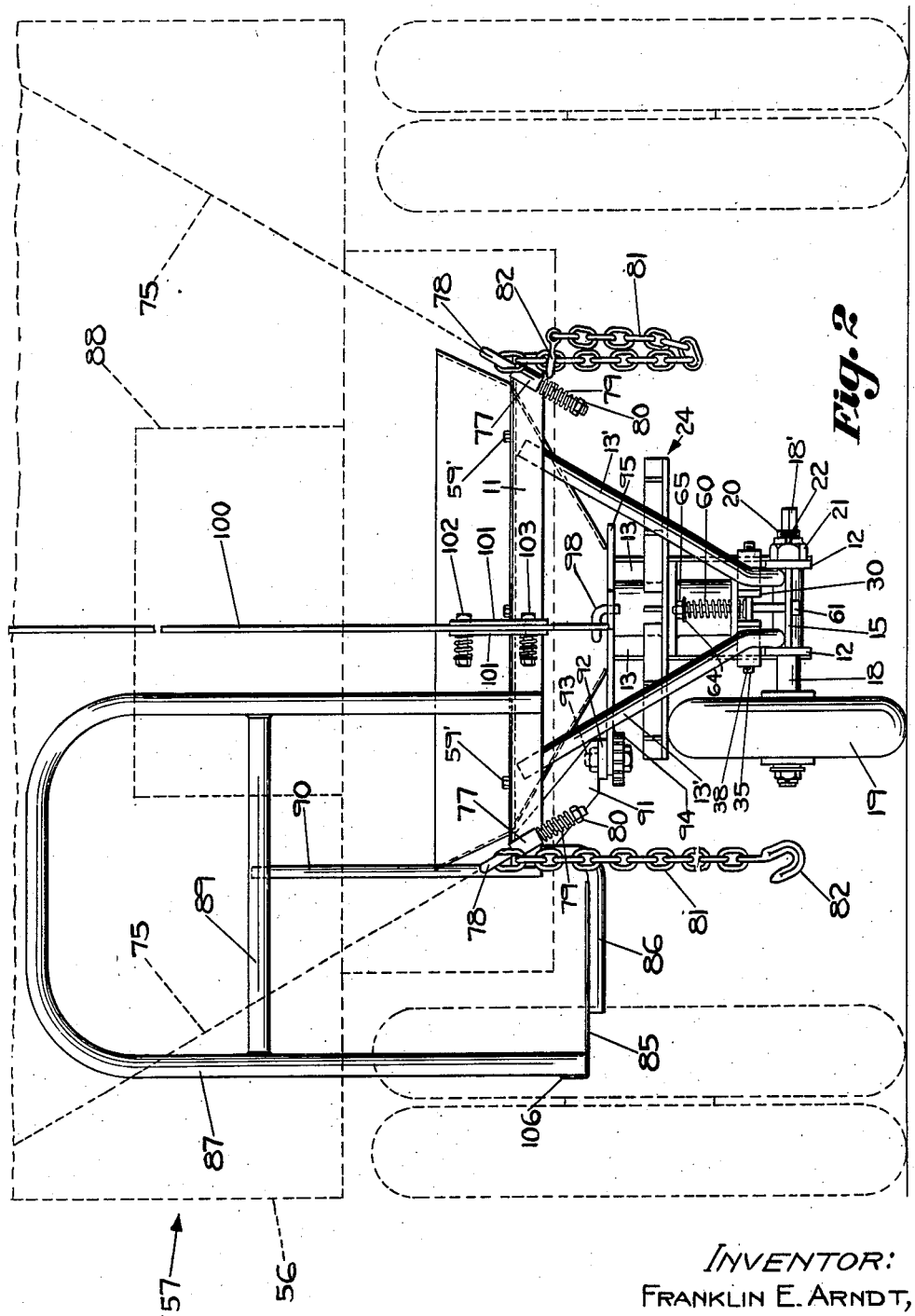

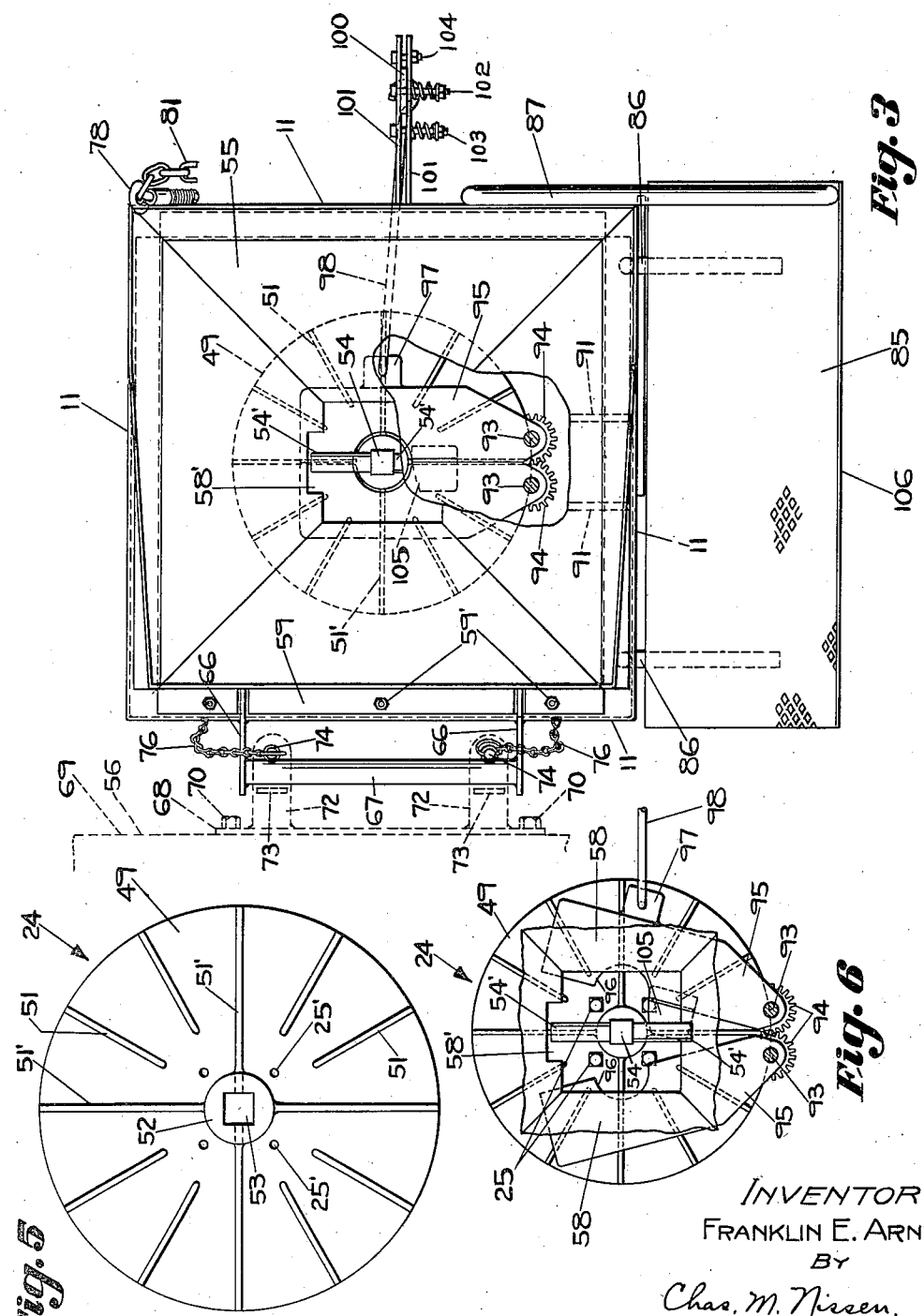

June 3, 1941.　　　　F. E. ARNDT　　　　2,244,414
SPREADER
Filed Oct. 14, 1938　　　　4 Sheets-Sheet 4
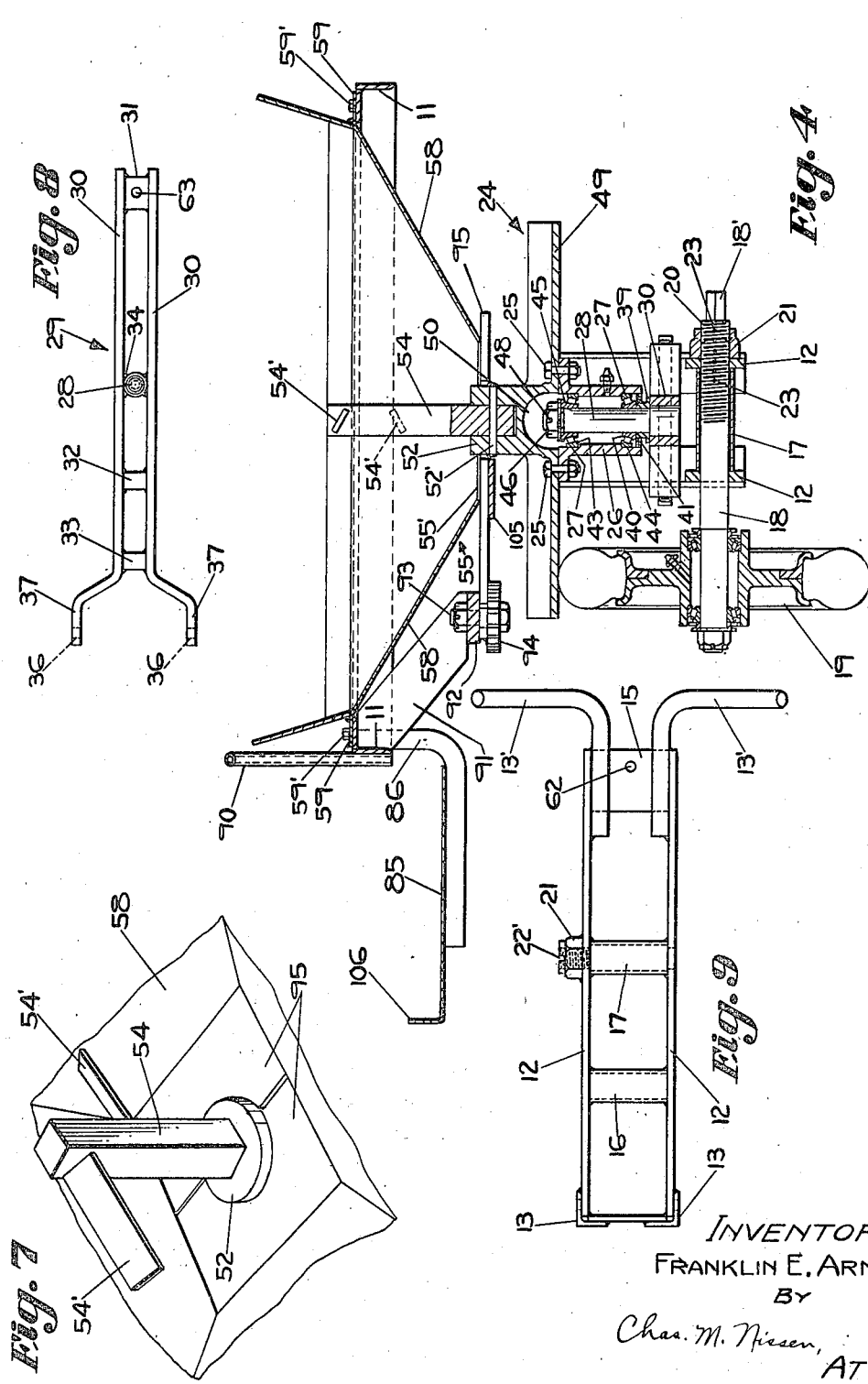
INVENTOR:
FRANKLIN E. ARNDT,
By
Chas. M. Nissen,
ATT'Y.

Patented June 3, 1941

2,244,414

UNITED STATES PATENT OFFICE 2,244,414

SPREADER

Franklin E. Arndt, Galion, Ohio, assignor to The Galion Iron Works & Manufacturing Company, a corporation of Ohio Application October 14, 1938, Serial No. 235,000

1 Claim. (Cl. 275—8)

My invention relates to spreading apparatus adapted to be hitched to and towed behind a self-propelled dumping truck, and one of the objects of the invention is to improve and simplify a spreader of this type to increase the efficiency of operation thereof.

Another object of the invention is the provision of improved and efficient mechanism for mounting a rotary spreading device to provide enclosed lubricating means therefor.

A further object of the invention is the provision of thrust bearing mechanism for a rotary spreader, held in yielding driving engagement with a ground engaging wheel in position to receive on the upper side of the spreading device granular material from a hopper.

Another object of the invention is the provision of improved and efficient mechanism for adjusting a ground engaging wheel toward and from the axis of rotation of a rotary spreader, the under side of which is frictionally engaged by the periphery of the wheel.

A further object of the invention is the provision of improved valve mechanism and means for operating the same to control the quantity of flow of material from a hopper to a rotary spreader.

Another object of the invention is the provision of an agitator in a hopper to not only stir the material to keep it from packing but also to convey the material downwardly to assist gravity in feeding the material from a hopper to a rotary spreader.

A further object of the invention is the provision of an operator's station on a spreader, adapted to be hitched to and hauled behind a self-propelled dumping truck, such operator's station being located at that side of the spreader near the rear end of the dumping truck where the operator may signal the driver of the truck and where such operator may control the gate at the rear end of the truck for flow of material from the truck to the hopper of the spreader.

Another object of the invention is the provision of improved and efficient means for flexibly connecting a material spreader to the rear end of a self-propelled dumping truck having a tiltable body so that when the spreader is pivotally hitched to the dumping truck, the movement of the tiltable body of the dumping truck to horizontal position will automatically lift the spreader from the roadway and hold the same in elevated position for transportation.

Other objects of the invention will appear hereinafter, the novel features and combinations being set forth in the appended claim.

In the accompanying drawings,

Fig. 2 is a rear end elevational view of the spreader shown in Fig. 1;

Fig. 3 is a plan view of the spreader shown in Figs. 1 and 2;

Fig. 4 is a sectional elevational view taken on the line 4—4 of Fig. 1 looking in the direction of the arrows;

Fig. 5 is a plan view of a spreader disc including its radial fins;

Fig. 6 is a plan view of the valve mechanism for controlling the flow of material from the discharge opening in the bottom of the hopper to the rotary spreader disc;

Fig. 7 is a perspective view of the agitating mechanism in the lower portion of the hopper above the valve plates;

Fig. 8 is a plan view of the auxiliary frame which supports the spreader disc; and Fig. 9 is a plan view of the lower portion of the main frame.

Figure 1:
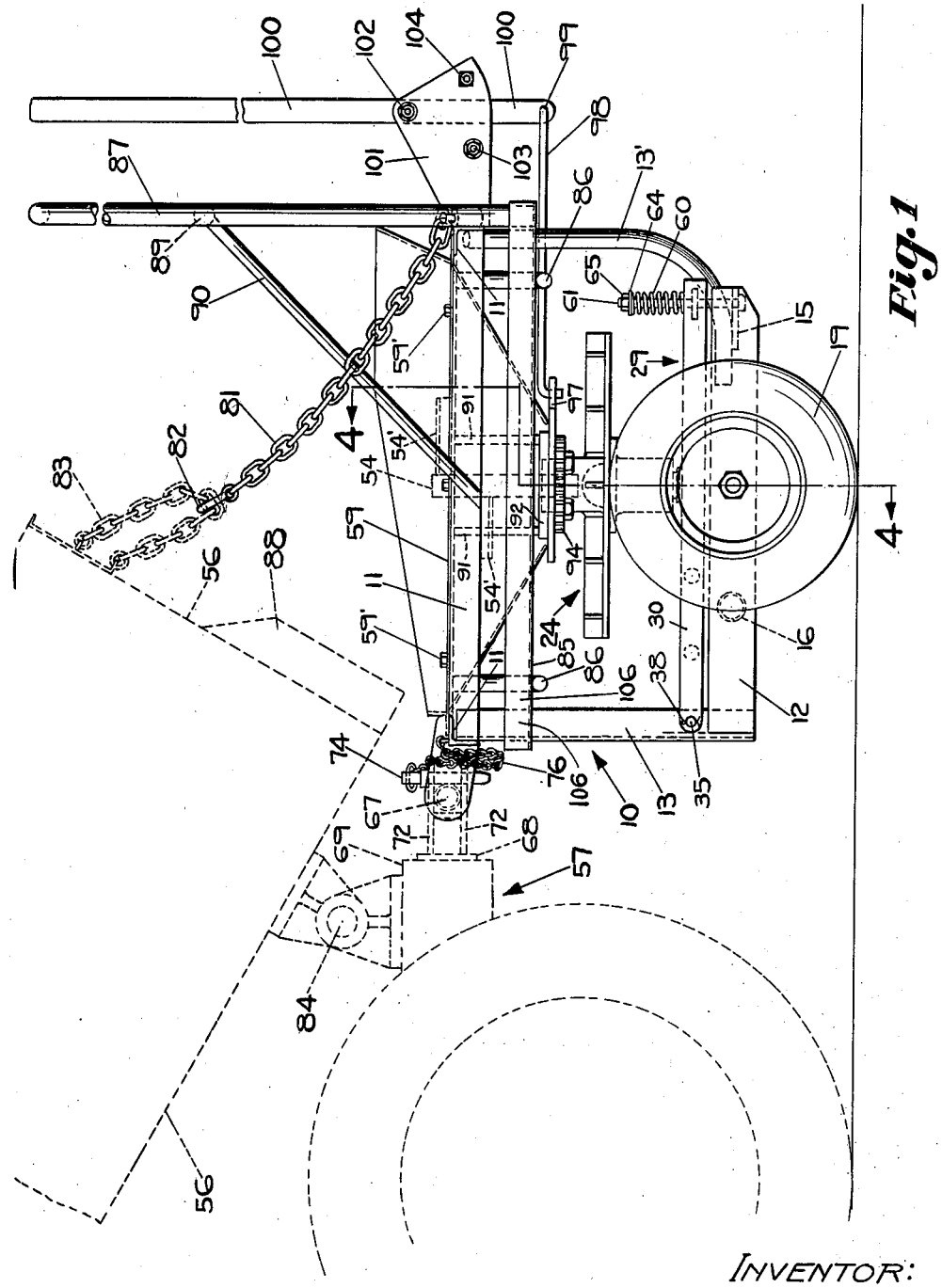
Fig. 1 is a side elevational view of the spreader operatively connected to a self-propelled dumping truck having a tilting body adapted to be connected to the spreader so that when the forward end of the tilting body is lowered the spreader will be lifted off the ground and supported for transportation.

Referring to the accompanying drawings, the spreader embodying my improvements, comprises a supporting frame 10 having top angle irons 11, bottom plate members 12, and upright supports 13, 13', all of which are rigidly connected together, preferably by welding.

While the top of the supporting frame is shown square in outline in Fig. 3, the bottom plate members 12 are spaced apart only a short distance, as shown in Figs. 2 and 9, and consequently the vertical uprights 13, 13 are spaced apart only a short distance at their upper and lower ends. Likewise the lower ends of the uprights 13', 13' are spaced apart accordingly, as shown in Figs. 2 and 9.

A horizontal reinforcing plate 15 and reinforcing pipes 16 and 17 connect the spaced-apart vertical plates 12, 12, as shown in Figs. 1 and 9. The reinforcements 15, 16 and 17 are preferably welded at their ends to the plates 12, 12, and serve as spacers for these plates.

The reinforcing pipe or tubular connection 17 between the bottom plates or bars 12, 12 serves also to receive and support the axle 18 on the left-hand end of which is journaled the ground engaging wheel 19. That end of the axle 19 remote from the wheel 19 is screw-threaded at 20 through a nut 21 which is welded to the right-hand plate or bar 12, as viewed in Fig. 4. This plate 12 with the nut 21 welded thereto is shown more clearly in Fig. 9. The axle 18 may be locked in adjusted position relative to the plates or bars 12 by means of a cotter pin 22 fitting in notches 22' of the nut 21 and extending through one of the series of transverse perforations 23 in the axle 18, as shown in Fig. 4. When the cotter pin 22 is removed, the axle 18 may be rotated by applying a wrench to the squared extension 18' from the shaft 18. In this manner the screw-threaded portion 20 may be threaded through the fixed nut 21 and thereby adjustment may be made of the position of the ground engaging wheel relative to the frame and relative to the spreader disc 24 for a purpose hereinafter more fully explained.

The disc 24 is detachably mounted by means of the bolts 25, 25 on the hub 26 which is journaled by means of the conical thrust bearings 27, 27 on the upright bearing shaft 28 which is secured at its lower end, preferably by welding, to the auxiliary pivoted frame 29.

The auxiliary frame 29, as shown in Fig. 8, comprises spaced-apart parallel plates or bars 30, 30 rigidly connected by the spacers 31, 32, 33. Intermediate the spacers 31 and 32 the enlarged lower end of the upright bearing shaft 28 is welded to the spaced-apart plates or bars 30, 30, as shown at 34 in Fig. 8.

The left-hand end of the auxiliary frame 29, as viewed in Fig. 8, shows the bars 30, 30 spaced-apart a distance sufficient to embrace the outer sides of the vertical angle irons 13, 13. A pivot pin 35 is adapted to extend through openings 36, 36 in the arms 37, 37 of the auxiliary frame 29. The pivot pin 35 also extends through perforations in the vertical angle irons 13, 13 a short distance above the plates 12, 12, as shown in Fig. 1. Cotter pins 38 at the end of the pivot pin 35 retain the latter in fixed relation to the main and auxiliary frames.

It should be particularly noted that the spreader disc 24 is carried by the auxiliary frame 29 and moves up and down bodily therewith. Mounted on the auxiliary frame 29 and fixed to the bearing shaft 28 is a collar 39, and fixed to the bearing shaft 28 on top of the collar 39 is the lower conical roller bearing 40. A lubricant seal surrounding the collar 39 is shown at 41 in Fig. 4.

The ring bearings 43, 44 fit against reverse shoulders on the inner side of the hub 26, as shown in Fig. 4. The upper conical ring bearing member 45 is slidable vertically on the bearing shaft 28 so that by means of the nut 46 on the upper screw-threaded end of the bearing shaft 28, the spaced-apart conical thrust bearings may be taken up and the nut 46 then locked in adjusted position by means of the cotter pin 48.

The spreader disc structure is shown in Figs. 4 and 5 and comprises a plate 49 which is flat or plane on its under side and has radial fins 51, 51' integral therewith on its upper side. The center of the plate 49 on its under side is provided with a semi-spherical recess 50, as shown in Fig. 4, so as to provide ample space for the upper end of the bearing shaft 28 and the nut 46 thereon. By removing the bolts 25, the spreader disc may be detached from the hub 26 for the purpose of introducing lubricant into the chamber containing the conical thrust bearings shown in Fig. 4.

At the center of the upper side of the plate 49 is a cylindrical projection 52 which is provided with a socket 53 square in cross-section to receive the lower end of the agitator post 54. It will be seen by referring to Figs. 4 and 5 that the fins 51', 51' are integral with the upwardly extending projection 52 and radiate therefrom 90° apart. The other fins 51, 51 extend inwardly from the circular edge of the disc plate 49 with their inner ends spaced from the cylindrical projection 52. The holes or perforations 25' for receiving the bolts 25 are preferably arranged as shown in Fig. 5. All of the radial fins 51, 51' extend above the plate 29 the same distance.

The upper end of the cylindrical projection or socket holder 52 extends a short distance upwardly through the center of the open bottom of the hopper 55, the upper side of which is also open to receive the material dumped from the tilting body 56 of the self-propelled dumping truck 57, as illustrated in dash lines in Fig. 1.

The lower end portion of the agitator post 54 is square in cross-section to fit the square socket 53 and this lower end portion is provided with a transverse opening adapted to register with radial openings in the cylindrical projection 52 to receive a rivet 52', as shown in Fig. 4. The upper portion of the agitator post 54 is provided with radially extending agitator blades 54' radiating from opposite sides of the post at varying distances from the discharge opening 55' in the bottom of the hopper 55. Each of the radial agitator blades 54' is set at an angle so that the leading face will be inclined downwardly and rearwardly relative to the direction of rotation of the spreader disc 24. It can readily be seen by referring to Figs. 1 and 4 that when the dumping truck moves forward the ground engaging wheel 19 by frictional engagement with the under plane surface of the plate 29 will drive the latter in a clockwise direction, when viewed in plan. Consequently such rotation of the blades 54' will cause them to act not only as agitating blades but also as propeller blades to assist gravity in moving the material in the hopper downwardly to and through the hopper discharge opening 55'.

The hopper 55 may be composed of flat plates 58, 58 with their upper edges at the angle irons 11, 11 extended upwardly at a less angle, as shown in Fig. 4. The hopper may be bent into shape from a single piece of sheet metal and then horizontal plates 59 may be welded to the outer walls of the hopper to extend laterally therefrom so as to rest on the angle irons 11. One of such plates is illustrated at 59 in Fig. 1 and each of the four plates may be secured to the angle irons 11 by means of the bolts 59'. It will thus be seen that the hopper has an open top and has a discharge opening in its bottom and that this hopper is removably attached to the main frame. The hopper is in the form of an inverted truncated pyramid with the edges of the open bottom square in formation with the exception of the cut-away portion 58', as shown in Figs. 3 and 6. The open bottom 55' of the hopper is spaced above the spreader disc 24 with the agitator socket holder 52 projecting upwardly a short distance into the hopper, as shown in Fig. 4. The edges of the hopper discharge opening 55' surround the cylindrical upper projection 52 but the hopper discharge opening is of such size as to provide ample space for free flow of material from the bottom of the hopper 55 to the top of the rotary spreader disc 24. By reason of the propeller blades 54′ arranged as shown in Figs. 4 and 7, a downwardly propelling action is afforded for the material in addition to a stirring action thereof, so that any tendency of discontinuance of flow of material by gravity from the hopper will be avoided. Furthermore, such stirring action and propelling action will produce a more uniform flow of the material so as to be in accordance with the speed of travel of the towing vehicle to which the spreader is hitched.

As shown in Fig. 4, the ground engaging wheel 19 is journaled to the left-hand end of the axle 18 in such a manner that when the axle 18 is adjusted relative to the plates or bars 12, the periphery of the rubber-tired wheel 19 will frictionally engage the flat or plane bottom of the spreader disc 24 at an adjusted distance from its center of rotation. Therefore when the axle 18 is adjusted axially relative to its support, the speed of rotation of the spreader disc 24 may be varied. Whenever the speed of rotation of the spreader disc 24 is varied, the speed of rotation of the propeller blades 54′ is likewise varied. The nearer to the center of the spreader disc 24 the ground engaging driving wheel 19 is adjusted, the faster the disc will be rotated and the greater the area will be over which the material is spread. For instance, when sand is distributed on icy pavements, it is desirable that the spreader shall throw the material ahead of the rear wheels of the towing truck as well as ahead of its own wheel 19 to assure adequate traction. At the same time two lanes of traffic may have sand distributed thereon by a single trip of the truck and spreader. The increase of rotation of the spreader disc 24 will also effect increased rotation of the agitating mechanism, and consequently the faster the material can flow from the hopper.

The spreader disc 24 may be made of metal, such as iron or steel, or other material, and its lower flat side may have attached thereto a layer of friction material, but I prefer the rubber-tired driving wheel 19 frictionally engaging the flat metal side of the rotary spreader disc 24.

In order to hold the lower flat side of the spreader disc 24 yieldingly against the periphery of the rubber-tired ground engaging wheel 19, a compression spring 60 is mounted at that end of the auxiliary frame 29 remote from the pivot 35 so as to urge the auxiliary frame 29 down toward the reinforcing plate 15 which connects the plates 12. The spring 60 surrounds a bolt 61, the lower end of which extends through an opening 62 in the spacer 15 between the plates 12. The bolt 61 also extends through an opening 63 in the spacer 31 between the plates 30. The upper end of the bolt 61 extends through a washer 64 on top of which is a nut 65, by means of which the tension in the spring may be adjusted. Inasmuch as the spring 60 urges the right-hand end of the auxiliary frame 29, as viewed in Fig. 1, in a downward direction, the bearing shaft 28 and nut 46 shown in Fig. 4 transmit this downward force to the spreader disc 24 so as to hold the latter yieldingly against the periphery of the ground engaging wheel 19. Any irregular periphery of the wheel 19, such as that caused by road material clinging thereto, will not interfere with maintenance of frictional engagement between the periphery of the wheel and the bottom of the spreader disc.

The hitching mechanism for connecting the spreader to a self-propelled dumping truck is shown in Figs. 1 and 3 and comprises a drawbar structure composed of spaced-apart vertical plates 66, 66 rigidly connected to the forward upper edge of the main frame, with the forward ends of the plates 66 rigidly connected together by means of the pipe 67. The supporting plate 68 may be connected to the rear end of the vehicle frame 69 by means of the lag screws 70 extending through perforations in the plate 68.

Extending rearwardly from the plate 68 are two pairs of vertically spaced horizontal bracket plates 72, 72 connected by vertical spacer plates 73, 73 which serve to act as abutments for the front side of the pipe 67 when the latter is located between the bracket plates 72, 72, as shown in Figs. 1 and 3. The drawbar plates 66, 66 are preferably located outside of the spacer plates 73, as shown in Fig. 3. Coupling pins 74 are adapted to be inserted through vertically aligned openings in the spaced-apart bracket plates 72, 72. The coupling pins may be connected by means of chains 76 to the main frame of the spreader, as shown in Figs. 1 and 3.

At the rear of the top edge of the main frame of the spreader and at the corners thereof are located inclined sockets 77, 77 in diverging relation to each other, as shown in Fig. 2, for receiving the screw eyes 78, 78 which project downwardly a sufficient distance for receiving the compression springs 79, 79 between the nuts 80, 80 and the bottoms of the sockets 77, 77, as shown in Fig. 2. By means of the nuts 80 the tension of each of the springs 79 may be individually adjusted and the nuts then locked in adjusted position to the screw eyes 78.

Chains 81, 81 are connected to the screw eyes 78, 78 and provided at their free ends with hooks 82, 82 which are adapted to be connected to the loop chains 83 mounted on the rear end of the truck body 56, as shown in Fig. 1. It should be understood that there are two loop chains at the rear end of the truck body one on one side thereof and the other on the other side thereof and that the hook 82 of one chain 81 is connected to one of these loop chains 83 and the other hook 82 of the other chain 81 is connected to the other loop chain 83.

It can readily be seen by referring to Fig. 1 that when the forward end of the truck body 56 tilts downwardly on its pivot 84, the chains 81, 83 will effect lifting of the driving wheel 19 from the ground. The springs 79 will act as shock absorbers both when the spreader is lifted from the roadway and during transportation of the spreader while up off the roadway. Since the loop chains 83 are connected to the rear end of the truck body on opposite sides thereof, the pulls on the chains 81 will be in the direction of the dotted lines 75, 75 and consequently the sockets 77, 77 are inclined in converging relation to each other, as shown in Fig. 2, so as to facilitate movements of the screw eyes 78, 78 in their sockets 77, 77.

During transportation the truck body 56 for containing the road material occupies a horizontal position but when the spreader is to be operated such truck body is tilted to the position shown in Fig. 1, whereupon the supporting chains 81, 83 will let the spreader down to the roadway. During operation of the spreader, the chains 81 and 83 are disconnected. The tilting of the truck body 56 is such as to regulate the flow of material therefrom through a center gateway at the lower rear end of the truck body, as illustrated at 88 in Fig. 2.

The spreader operator's station is on the platform 85 which is secured by means of the brackets 86, 86 to one side of the main frame of the spreader. An inverted U-shaped rod 87 is secured at its lower ends to the rear end of the main frame of the spreader and to the rear end of the platform 85, as shown in Fig. 2. The upper horizontal portion of the rod 87 may be used as a rail to be grasped by the right hand of the spreader operator, while with his left hand he may open the gate at the rear end of the truck body 56, or assist the flow of the material into the hopper by means of a rake or other tool. The hand rail 87 may be in the form of a pipe with its lower ends welded to the rear end of the main frame of the spreader and to the rear outer edge of the platform 85. A reinforcing cross-pipe 89 may have its ends welded to the rail 87 and a diagonal brace rod 90 may have its upper end welded to the cross-piece 89 and its lower end welded to the main frame of the spreader, as shown in Figs. 1 and 2.

It should be particularly noted that the operator's platform 85 is preferably located on the left-hand side of the spreader, as viewed in Fig. 2, so that the spreader operator may signal the operator of the truck, through the latter's driving mirror. Such signalling to the truck operator is for the purpose of controlling the speed of travel of the truck and the tilting of the truck body 56, while the spreader operator has under his observation the rate of flow of material from the truck body 56 into the hopper 55 and the spreading of the material on the roadway by means of the rotary spreader 24.

However, by means of valve mechanism associated with the discharge opening in the bottom of the hopper, the spreader operator may control or regulate the volume of flow from the hopper to the rotary spreader. By means of vertical spaced-apart bracket plates 91, 91, a horizontal cross-piece 92 is supported in the position shown in Fig. 2 to afford support for two spaced-apart bolts 93, 93 to serve as pivotal bearings for the intermeshing gears 94, 94.

Secured to these gears 94, 94 are horizontal valve plates 95, 95 each of which is provided with a semi-circular recess 96 to fit around the cylindrical socket holder 52. It will thus be seen that since the gears 94 are rigidly attached to plates 95, the lower heads of the bolts 93 support the gears and the valve plates. The bolts extend through perforations in the cross-piece 92 and have nuts locked to their upper ends, as shown in Fig. 4.

The rear valve plate 95 has a rearwardly extending bracket 97 to which is pivotally connected a link 98 the rear end of which is pivoted at 99 to the lower end of the operating lever 100. A pair of spaced-apart vertical bracket plates 101, 101 are secured to the rear end of the spreader frame and extend rearwardly therefrom, as shown in Fig. 1, to receive between them the lower portion of the operating lever 100. Spring-pressed bolts 102, 103 connect the plates 101, 101 so as to frictionally hold the operating lever in adjusted position. The operating lever is pivoted to the upper spring-pressed bolt 102 while the lower spring-pressed bolt 103 serves as an abutment to limit the rearward movement of the upper end of the operating lever 100. An additional bolt 104 between the plates 101 serves as an abutment to limit the forward movement of the upper end of the operating lever 100. The bolt 104 is shown in Fig. 1 but has been omitted from Fig. 2. The abutment 103 corresponds to the closed position of the valve mechanism, as shown in Fig. 3, whereas the abutment 104 corresponds to the open position of the valve mechanism, illustrated in Fig. 6. Also, as shown in Fig. 6, a small plate 105 is secured to the bottom of the plate 95 that carries the bracket 97. The other plate 95 may overlap the plate 105 when the valve mechanism is in the closed position shown in Fig. 3. This arrangement assures movements of the plates 95 toward each other in the same plane in close fitting relation to the edges 55' of the bottom discharge opening of the hopper.

By means of the valve mechanism the spreading of the material may be continuous or intermittent. The flow of material and the volume of flow depends upon the feed valve setting. The feed valve control lever 100 is within easy reach of the operator as he stands on the platform 85. The valve is a two section or double gate type, one section being operated by direct connection to the control lever 100 and the second section operates in unison as the two sections 95, 95 are geared together at the pivot points 93, 93.

The width of spread of the material is governed by the speed of travel of the dumping truck and by the adjustment of the automotive wheel 19 toward or from the vertical axis of the rotary spreader disc 24. The operator's platform 85 is located on the left-hand side of the spreader where the operator can signal the operator of the truck as above explained. The floor of the platform 85 is preferably a safety tread steel plate with the outer longitudinal edge turned up, as shown at 106 in Fig. 4, as an extra safety factor.

The operator while standing on the platform 85 can adjust the gate at the rear end of the truck body 56 to regulate the flow of material to the hopper 55, then by operation of the valve lever 100 the spreader operator can start, stop and regulate the distribution of the material to vary the thickness or density of the spread. The agitator rotates continuously in the material in the hopper just above the feed valve mechanism. The blades 54' also act as propellers to feed the material as well as to keep it from packing. During spreading operations the chains 81 need not be hooked to the truck. The function of the chains 81 is to support the spreader up off the ground while being taken to or from a distributing operation. The eye bolt sockets 77 are set at converging angles, as shown in Fig. 2, to permit the chains 81 to support the spreader from the corners of the rear ends of the truck dump body to support or suspend a load of material in the hopper in good riding position without cramping the action of the snubber springs 79.

While sand has been mentioned as a spreading material, it should be understood that other materials, such as stone dust, cinders, slack, chips, calcium chloride, rock salt, chemically treated abrasive or other materials may also be spread on highways to eliminate ice hazards or other hazards of the highway. The various adjustments disclosed are desirable on account of the varying conditions met with and on account of the various materials used. For instance, chemically treated material will act more quickly and imbed itself more securely in icy surfaces than untreated materials, and the distribution of chemically treated abrasive materials in addition to offering immediate safety for travel of vehicles, tends to melt ice or honey-comb the deposit so that the tires of vehicles in traffic will break it into slush and thus minimize the skidding hazards on the highways.

The valve mechanism comprising the valve plates 95, 95 shown in Figs. 3 and 6, and the mechanism for operating these plates, comprising the intermeshing gears 94, are disclosed and claimed in my co-pending application, Serial No. 306,484, filed Nov. 28, 1939 for an improvement in Spreaders as a division of this application. The thrust bearing structure associated with the upright bearing shaft 28, as shown in Fig. 4, is disclosed and claimed in my co-pending application, Serial No. 285,935, filed July 22, 1939 for an improvement in Spreaders, as a division of this application. The rotary spreader having the agitator socket non-circular in cross-section, as shown in Fig. 5, considered as an article of manufacture, is disclosed and claimed in my co-pending application Serial No. 285,936, filed July 22, 1939 for an improvement in Spreaders, as a division of this application.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

In a material spreader, the combination with a frame, of a support mounted thereon for rotation relatively thereto on an upright axis, a hopper mounted on said frame and having a discharge opening in its bottom, agitating and downwardly propelling mechanism mounted on said support in position to act on material in said hopper, a distributor mounted on said support to rotate therewith, a ground engaging wheel connected to said frame with the periphery of said wheel in frictional driving engagement with the underside of said distributor to secure rotation of the latter and said agitating and downwardly propelling mechanism when the spreader travels over the ground, and mechanism for connecting said frame to a dumping truck with the distributor in such a relatively low position as to distribute the material not only laterally and rearwardly but also forwardly toward the rear wheels of the dumping truck.

FRANKLIN E. ARNDT.